Oct. 25, 1932.  W. L. VAN NESS  1,884,926
GLASS MANUFACTURE
Filed Feb. 6, 1929  5 Sheets-Sheet 1
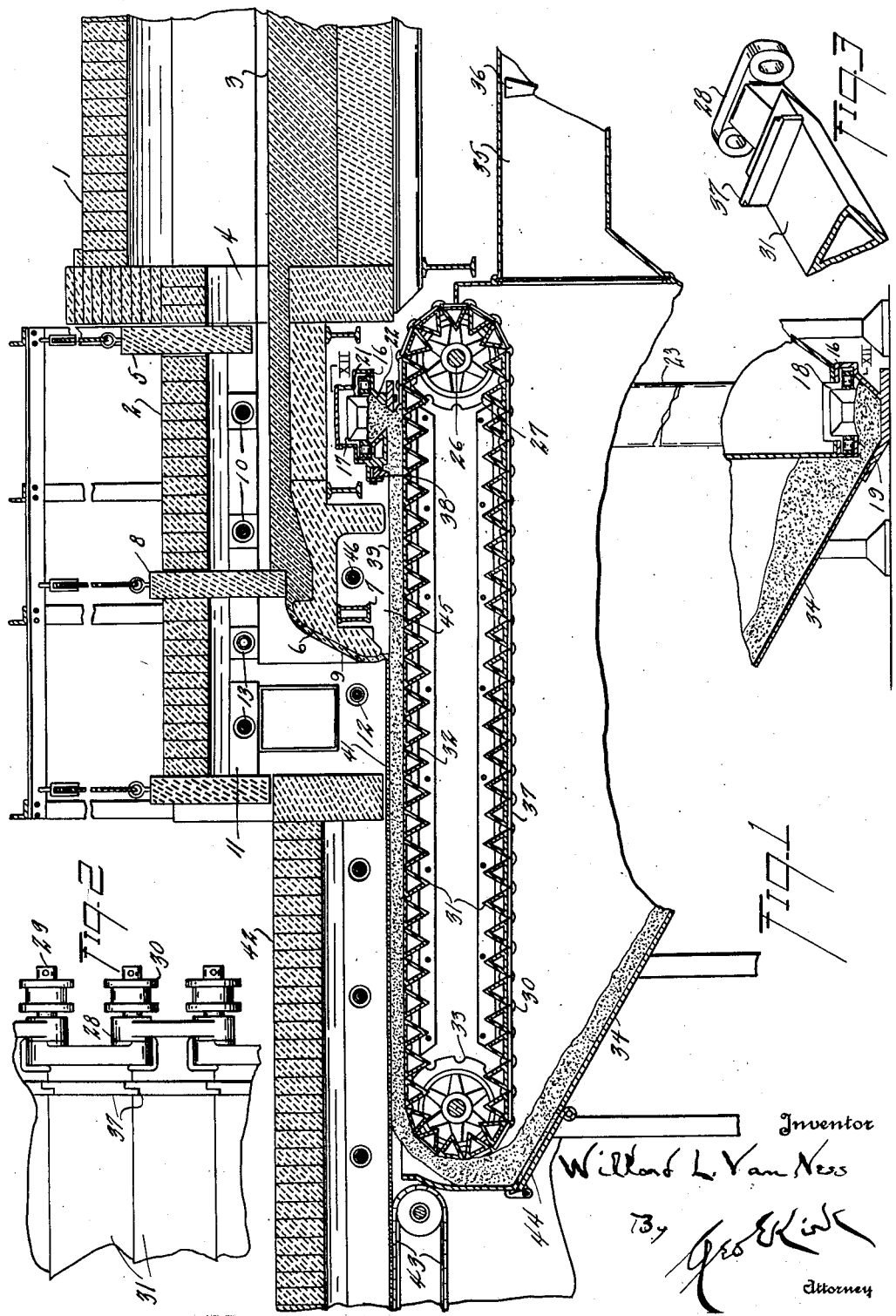

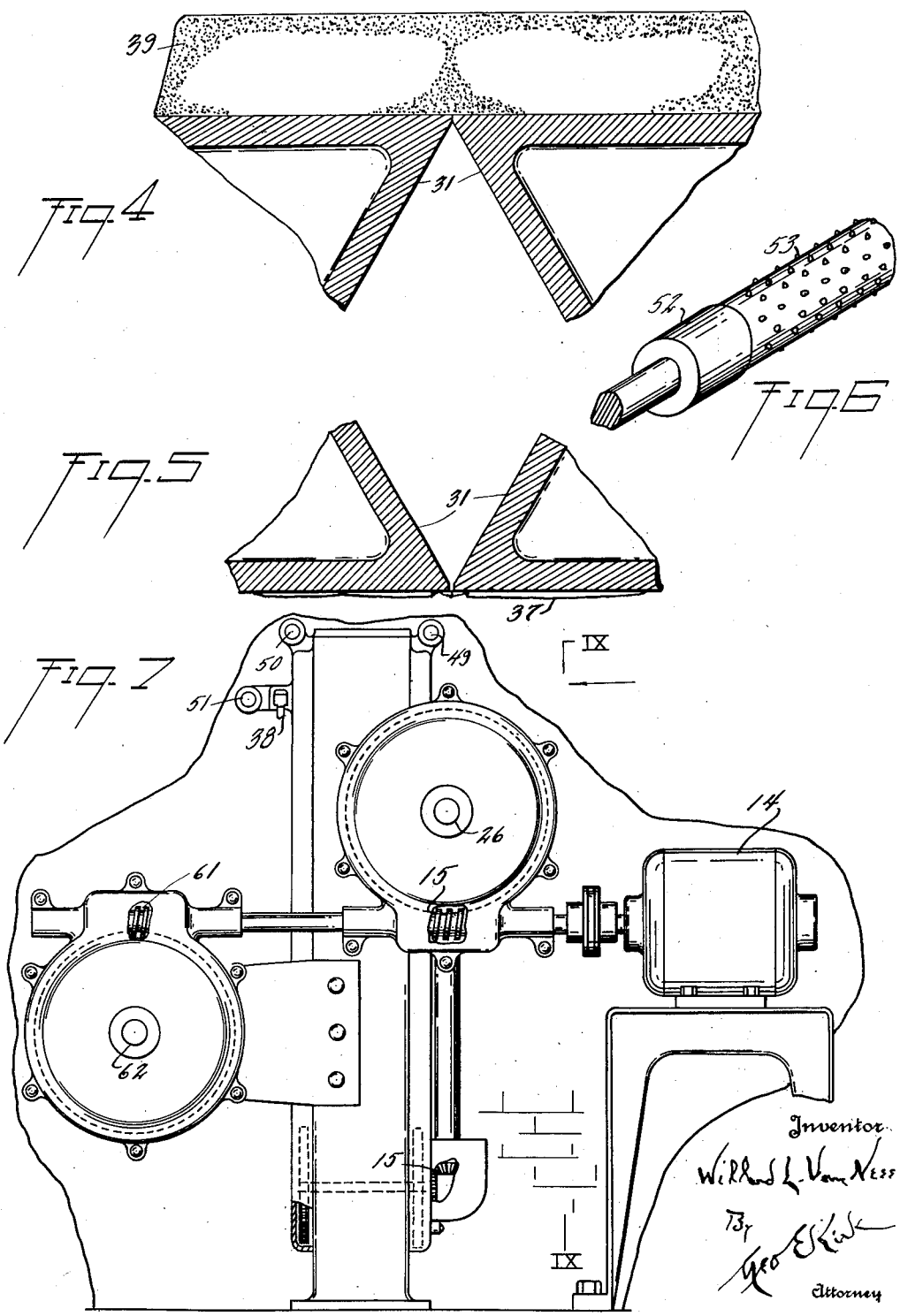

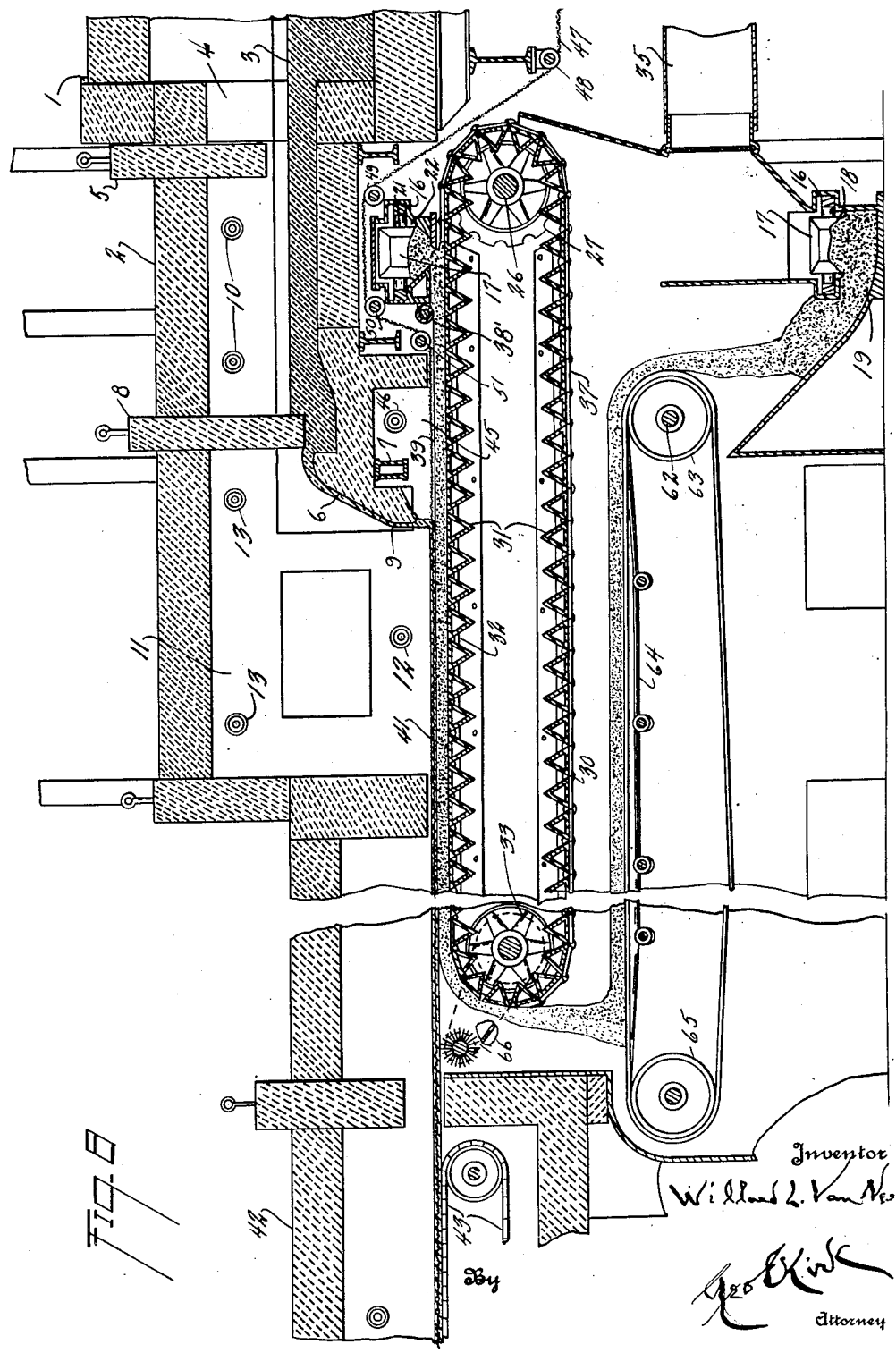

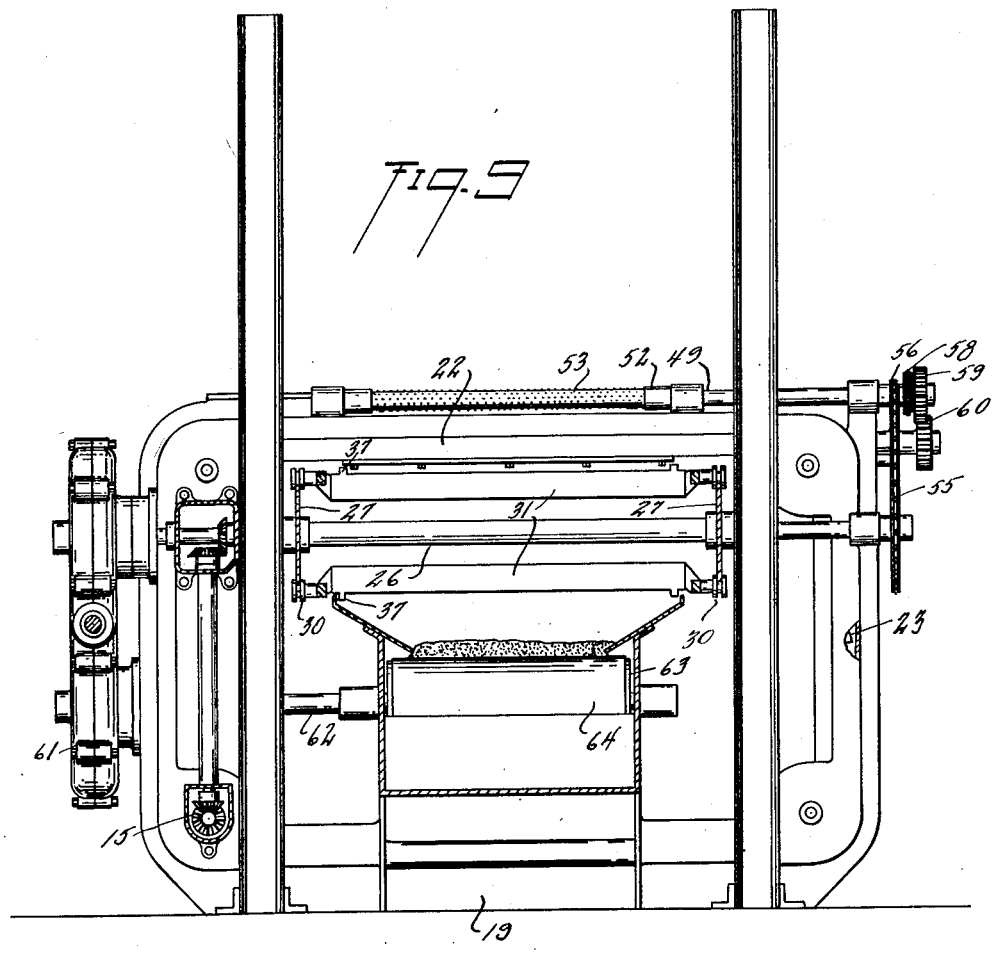

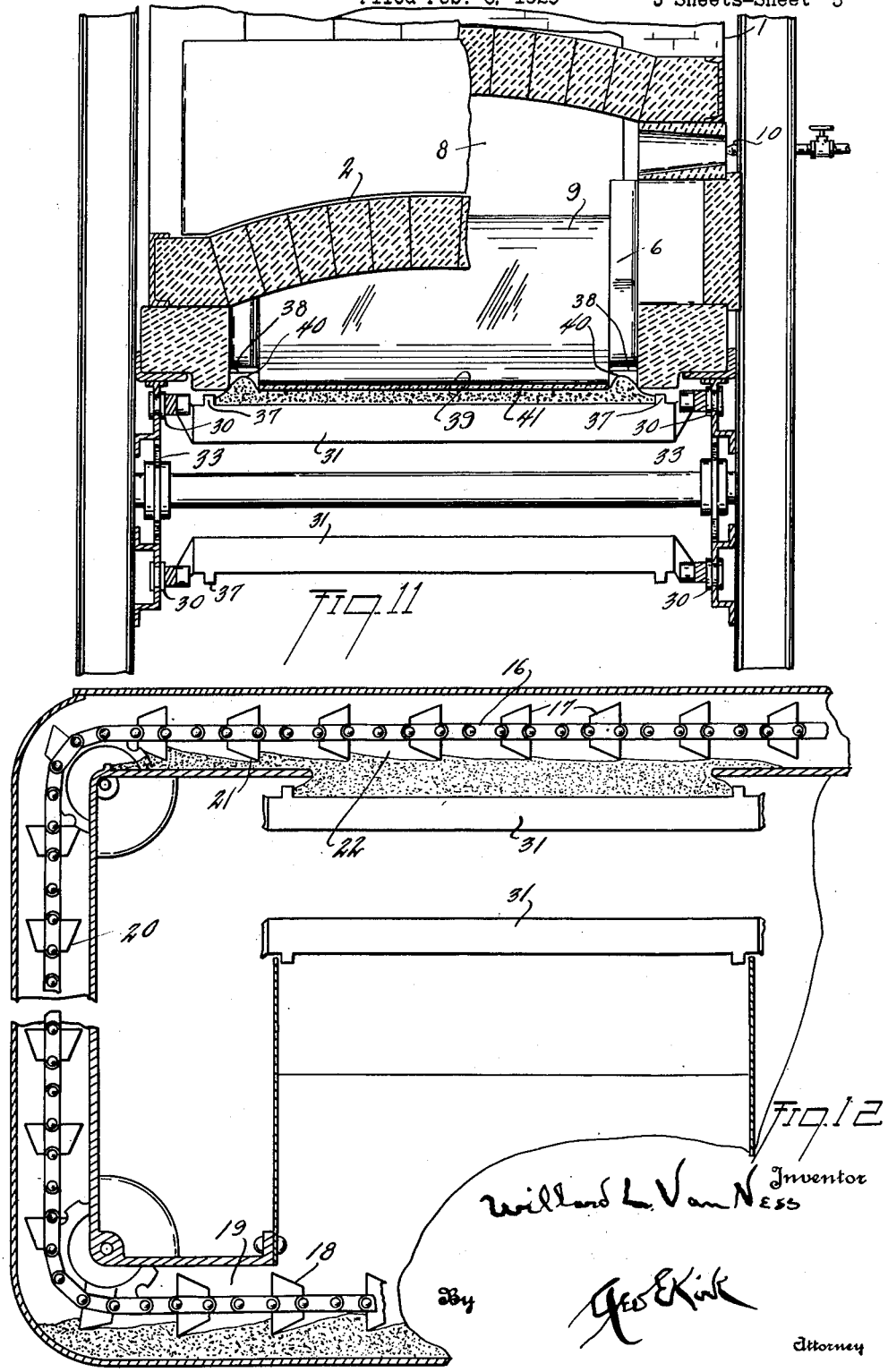

Patented Oct. 25, 1932

1,884,926

UNITED STATES PATENT OFFICE

WILLARD L. VAN NESS, OF TOLEDO, OHIO

GLASS MANUFACTURE

Application filed February 6, 1929. Serial No. 337,775.

This invention relates to the continuous forming of plastic material.

This invention has utility when incorporated in sheet glass manufacture, more especially for flow-off forming thereof.

Referring to the drawings:

Fig. 1 is a fragmentary view, partly in longitudinal section, of a portion of a glass tank having an embodiment of the invention incorporated therewith;

Fig. 2 is a partial plan view of a portion of the supporting conveyor;

Fig. 3 is a fragment of one of the conveyor elements in perspective;

Fig. 4 is an enlarged scale detail view in section of the supporting reach portion of the conveyor;

Fig. 5 is a fragmentary view of the conveyor element relations in the slack or return reach;

Fig. 6 is a perspective view of one end of a wire mesh driving roll;

Fig. 7 is a view of the driving mechanism;

Fig. 8 is a view similar to Fig. 1, in which mechanism is combined with the apparatus for the production of wire glass, said mechanism embodying an additional type of sand handling apparatus;

Fig. 9 is a view on the line IX—IX, Fig. 7, parts being broken away;

Fig. 10 is a view looking from the right of Fig. 9, and showing the wire mesh driving mechanism;

Fig. 11 is a transverse section of the conveyor showing portions thereof as in the lehr and as at the flow-off; and Fig. 12 is a section on the line XII—XII, Fig. 1, parts being broken away.

Glass tank 1 is shown as having forehearth 2. In the glass tank, pool 3 of molten glass is shown at a level to flow through port or eye 4. Drop member 5 may be controlled for cutting off this flow into the forehearth 2. This forehearth 2 is provided with flow-off lip 6 having water cooled support 7 therefor. Adjacent this lip 6 is refractory drop member 8 as a valve, similar to the member 5. This member 8 in its controlled positions may serve not only as a skimmer, but to regulate the thickness of the gravity flowing stream 9 over the lip 6. In the forehearth between the blocks 5 and 8, burners 10 may be adjusted for controlling the desired fluidity for the molten glass from the pool 3. Beyond this member 8, in the flow-off region, is chamber 11 with lower burner 12 and upper burners 13 for controlling the temperature of the flow-off stream 9 being gravity delivered from the pool.

Motor 14 (Figs. 7, 9, 12) is shown having speed reduction gearing 15 connected for driving endless chain 16 carrying conveyor buckets 17 having lower pick-up reach 18 at bin 19 with riser reach 20 and horizontal delivery reach 21. This horizontal delivery reach 21 is in hopper 22. From this hopper 22 the conveyor has idle return reach 23 to the bin 19. Accordingly, with continuous operation of this conveyor, there is maintained a reserve in this hopper 22.

The variable speed motor 14 through its speed reduction means 15, also operates drive shaft 26 carrying sprocket wheels 27 (Figs. 2, 8) about which extends sprocket chain 28 having trunnions 29 (Fig. 2) carrying rollers 30. These links of the chain 28 mount triangular shelf or body portions 31. As the rollers 30 travel on track 32, in thus positively locating upper reach for this endless belt conveyor extending from the sprocket wheel 27 to the follower sprocket wheel 33, there is provided by these hollow triangular blocks 31 a continuous floor passing under the hopper 22 for receiving material from this hopper 22. This endless table conveyor is held in its upper reach in snug fitting or compressed position, for the separate blocks are thrust together by the sprocket wheels 27 and held by the way 32, insuring a tight floor for the granular material from the hopper 22.

The configuration of these blocks as triangular allows, on the return reach, the destroying of the formed bed. The chain 28 passing about the sprocket wheels 33, dumps such granular material to flow by chute 34 into the bin 19, thus providing a closed circuit for the granular material. The configuration of this table-providing chain is such that in its lower reach over the chute 34 and the bin 19, the granular material may be readily fully dislodged and received by this chute and bin.

As a factor in minimizing dust accumulation and insuring no seepage of dust up from this chute and bin, there is provided from the closed bin 19 take-off outlet 35 with motor driven fan 36 therein to exhaust the bin 19 (Fig. 1).

In the handling of glass, a more or less fine silica sand may be the granular material hereunder. The triangular blocks 31 of the table conveyor are provided with ledges 37 determining the width for the sand bed maximum. However, within this width the preferred operation hereunder is to provide a molded channel, the granular material being dry formed. To this end, the delivery side of the hopper 22 is provided with scraper block 38, accurately determining a smooth surface for the molded granular material. Terminally of this block 38, the material is allowed to assume a higher level so that there is provided the central bed 39 with marginal flanges 40 within the terminal flanges 37 of the conveyor elements 31. Accordingly, the bed 39 and marginal ribs 40 determine a channel bed upon which the flow stream 9 of molten glass may be received and supported as molten sheet glass mass 41 to be conducted into lehr 42 for an interval of setting or shape-holding of the glass. As this interval elapses, the movable jointless bed of molded sand may progress at or depart from the flow rate of the stream of the glass. If the bed move less rapidly than the flow rate, the sheet is thickened as to the thickness of flow over the lip, while if the speed of the bed be greater, then the sheet is thinner than at the lip. This relative rate of bed travel accordingly may be means in addition to the member 8 for determining the desired thickness for the product.

The sheet from the bed extends into the lehr. The bed is dumped in the travel of the conveyor about the follower sprocket wheels 33. The now set or form-holding glass sheet continues in its horizontal travel into the lehr 42 upon lehr conveyor pan 43, as an endless conveyor for the interval of proper annealing.

The upper reach of this moving table for the bed serves in the spacing of the follower sprocket from the driving sprocket for holding the triangular blocks 31 in compression against sifting of the sand therebetween to thus insure effective bedding for the flowing glass. The tension on the lower reach of this table is such as to provide slight opening between the triangular plates of this table, so that the sand may sift therefrom.

In practice, the flow angle of repose of the sand may be reduced say by the introduction of some refractory material with such refractory sand, as powdered carbon or graphite or fine foundry molding sand. In the event the material of the bed is desired to be renewed or rescreened, such may be checked from flowing along the chute 34 by opening door 44.

In the region of the molded sand bed 39, 40, between the hopper 22 and the chamber 11, there is provided chamber 45 with burner 46 therein. With this provision, it is practicable to bring up or control the temperature of the bed so that the liquid flowing glass coming to rest upon this bed will be maintained in a liquid state for a length of time sufficient to allow the top surface to flatten out by the action of gravity and may not undergo other action which might detract from the quality of the glass product. This sand bed is of sufficient depth that there may be uniform cooling action on the lower side of the sheet glass in setting with the upper side of the glass fire-polished in the chamber 11. Accordingly, the product as delivered from the lehr 42 is of an approximately ground glass finish on one side thereof, so that in the event a glass of this character is desired, it is at once in merchantable form, while for transparency, it is only necessary to grind the supporting side of the glass.

For reinforcing the product, as in the production of wire glass, wire mesh 47 (Fig. 8) may be fed from under the tank 1 to extend about guide roll 48, and thence about drive roll 49 mounted adjacent the upper bin or hopper 22 so that the mesh may be conducted thereover to second drive roll 50. From the drive roll 50, the mesh extends downwardly about third drive roll 51 mounted just above the bed 39, as determined by live roll 38'.

The mesh is maintained in parallel relation to the granular bed and thus extends through the chamber 45 wherein it is heated by the burner 46. The mesh 47 extends from the chamber 45 to pass under the lip or spout 6 to have the glass stream 9 flow down upon and partially through the mesh, embedding the mesh therein, the quantity being so regulated that the mesh is disposed approximately medially of the thickness of the sheet 41'.

The feed of the mesh is synchronized with the speed of the conveyor carrying the granular bed. The drive rolls 49, 50, 51, comprise smooth faced end portions 52 and studded central portions 53 (Fig. 6) permitting engagement with and positive feeding of the mesh 47.

On the end remote from the speed reduction drive 15, the shaft 26 has sprocket 54 (Fig. 10) about which extends chain 55 to sprocket 56 mounted on the roll 49. The roll 49 also carries sprocket 57 having chain drive 58 therefrom to sprocket 58' on roll 50. In addition, the roll 50 has gear 59 in mesh with gear 60 fixed with the roll 51. The drive rolls are thus positively driven in synchronism with the shaft 26.

According to the extent of the table, it may be desirable to provide a conveyor for returning the granular material to the bin 19. In such instance, through speed reduction gearing 61, the motor 14 may drive shaft 62 (Figs. 2, 8) mounting roll 63 for actuating conveyor belt 64. The belt 64 in its upper reach to idle roll 65 extends past the region of the bed discharge to receive the bulk material therefrom and convey such for dumping into the bin 19. Rotating brush 66 may be provided for removing any adhering particles of the granular bed from the sheet 41.

What is claimed and it is desired to secure by United States Letters Patent is:

1. The method of producing sheet glass comprising defining a stream flow from a supply, providing a support, maintaining the stream fluid for taking form after delivery to said support, and progressing said support.

2. The method of producing shaped glass from a pool of molten glass comprising defining a stream gravity flow cross-section from the pool, pre-heating a finely subdivided non-plastic forming material, shaping said material into a jointless mold of the stream cross-section, and controlling the shaped glass production by progressing said heated mold as a stream support.

3. The method of producing cast from a supply of viscous vitreous liquid, comprising defining a stream from the supply, sustaining said stream in cast form on a bed, maintaining the stream fluid in flowing an interval to set to form at the bed, and moving said bed in determining ultimate proportion of the form.

4. The method of producing sheet glass from a pool of molten glass comprising defining a stream gravity flow cross-section from the pool, molding a granular refractory into a channel approximating stream width, determining for the stream a temperature against devitrification, flowing the stream by gravity to a flat top surface therefor on said channel, and continuously moving said channel with said stream.

5. The method of embedding material into glass comprising rendering the glass fluid, moving a horizontal flat support, delivering the material to be embedded spaced from and parallel to the plane of the support along the support, and flowing the fluid glass directly upon and through the plane material to the support.

6. In the continuous forming of glass, jointlessly molding a way therefor, pouring molten glass as fluid to take form after reaching said way, and progressing said way as a support for the glass.

7. In the continuous forming of glass, preforming refractory material fragments as a way for the glass, carrying the glass on the way for a setting distance for the glass, and conducting said glass from the way.

8. In the handling of material, the formation of a bed of granular material, flowing liquid glass to take form thereon, progressing said bed for a distance, removing the formed glass therefrom, destroying the bed, bulking such material from the bed, and delivering said bulk material for reformation of the bed to complete a cycle providing a closed circuit for the material.

9. A glass tank having a forehearth provided with a flow-off lip, a control therefor, and a molded granular material providing way for receiving the flow-off.

10. A sheet glass forming installation embodying a glass supply having a flow-off, a control for the flow-off, a progressing bed or table having a horizontally extending reach adjacent the flow-off, and a sand bed former for said reach in advance of said flow-off.

11. A sheet glass forming installation embodying a glass supply having a flow-off, a control for the flow-off, an endless conveyor having a horizontally extending reach adjacent the flow-off, a sand bed former for said reach, and a hopper for delivering said sand to the bed in advance of said flow-off.

12. A sheet glass forming installation embodying a glass supply having a flow-off, a control for the flow-off, an endless conveyor having a horizontally extending reach adjacent the flow-off, a granular material former for said reach, and heating means for the former in advance of said flow-off.

13. A sheet glass forming installation embodying a glass supply having a flow-off, a control for the flow-off, an endless conveyor having a horizontally extending reach adjacent the flow-off, a hopper over said reach in advance of the flow-off, and molding means for the flow-off for acting upon the material from the hopper.

14. A sheet glass forming installation embodying a glass supply having a flow-off, a control for the flow-off, an endless conveyor having a horizontally extending reach adjacent the flow-off, a hopper over said reach in advance of the flow-off, molding means for forming discharge from the hopper into a channel bed, bulk delivery means for said reach portion following the flow-off for receiving the channel material, and an elevator conveyor for completing material circuit from the chute to the hopper.

15. A glass forming installation embodying a glass supply flow-off, a movable support as a sand bed carrier; a hopper, former and heater in series on one side of the flow-off for delivering formed heated sand for the bed, and circuit completing means for conducting the sand from the other side of the flow-off back to said hopper.

16. A glass forming installation embodying a glass supply flow-off, a movable sectional support having a reach extending past said flow-off, and a drive for said sections connected to push said sections past said flow-off in shifting said sections into compression assembly along said reach at the flow-off.

17. A glass forming installation embodying a glass supply flow-off, a movable support providing a flat bed, and mesh delivery means in advance of said flow-off to said flat bed for supplying mesh material over the bed to be embedded by the flow-off.

18. A glass forming installation embodying a glass supply flow-off, a movable support providing a flat bed, mesh delivery means in advance of said flow-off to said flat bed for supplying mesh material over the bed to be embedded by the flow-off, and heating means for the mesh material.

19. A glass forming installation embodying a glass supply having a flow-off, a movable support, a hopper over said support in advance of said flow-off, a first conveyor for delivering material to the hopper for deposit on the bed, and a second conveyor from the support on the other side of the flow-off from the hopper for receiving material from the support and delivering to the first conveyor.

20. Producing sheet glass from a supply of molten glass comprising defining a stream gravity flow from the supply, controlling the stream, receiving and supporting the stream at a viscosity low enough to cause the stream to flatten out to set form, and progressing the stream as supported and determining the thickness of the set by the velocity of the progressing.

21. Depositing glass at a casting temperature, supporting said glass while maintaining a modified cooling temperature for the supported glass for initially flattening for the top surface thereof as supported in assuming a common level by the action of gravity before setting to form, and progressing said supported glass.

22. Depositing a molten glass stream, supporting said glass, maintaining a fluidity for initially flattening, controlling the stream volume, and progressing the support in determining the glass thickness.

In witness whereof I affix my signature.

WILLARD L. VAN NESS.